United States Patent
Yang et al.

(10) Patent No.: US 12,063,633 B2
(45) Date of Patent: Aug. 13, 2024

(54) SPS AND ULCG ENHANCEMENTS

(71) Applicant: QUALCOMM Incorporated, San Diego, CA (US)

(72) Inventors: Wei Yang, San Diego, CA (US); Yi Huang, San Diego, CA (US); Jay Kumar Sundararajan, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/405,973

(22) Filed: Aug. 18, 2021

(65) Prior Publication Data

US 2022/0061048 A1 Feb. 24, 2022

Related U.S. Application Data

(60) Provisional application No. 63/069,652, filed on Aug. 24, 2020.

(51) Int. Cl.
*H04W 72/0446* (2023.01)
*H04W 72/1268* (2023.01)
(Continued)

(52) U.S. Cl.
CPC ... *H04W 72/0446* (2013.01); *H04W 72/1268* (2013.01); *H04W 72/23* (2023.01); *H04W 72/11* (2023.01)

(58) Field of Classification Search
CPC ......... H04W 72/0446; H04W 72/1268; H04W 72/23; H04W 72/11; H04W 72/115
See application file for complete search history.

(56) References Cited

U.S. PATENT DOCUMENTS 11,395,284 B2 * 7/2022 Baek ............... H04W 72/569
2020/0092908 A1 3/2020 Li et al.
(Continued)

FOREIGN PATENT DOCUMENTS

| KR | 20190051841 A | 5/2019 |
| KR | 20190141793 A | 12/2019 |
| WO | WO-2021056562 A1 * | 4/2021 |

OTHER PUBLICATIONS

Aberu, Ranato B., "Uplink Grant-free Access for Ultra-Reliable Low-Latency Communications in 5G Radio Access and Resource Management Solutions", Aalborg University, Ph.d.-serien for Det Tekniske Fakultet for IT og Design, 2019, Total pp. 270 (Year: 2019).*

(Continued)

*Primary Examiner* — Shah M Rahman
(74) *Attorney, Agent, or Firm* — QUALCOMM Incorporated

(57) ABSTRACT

A configuration for a UE to utilize grant periodicity values that are not multiples or fractions of a slot. The apparatus receives, from a base station, a configuration for a periodicity for a configured grant, the configured grant being for communicating with the base station based on the corresponding periodicity. The apparatus communicates with the base station based on the configured periodicity in association with the configured grant, the communicating being one of receiving the plurality of PDSCHs associated with the configured grant based on the corresponding configured periodicity or transmitting the plurality of PUSCHs associated with the configured grant based on the corresponding configured periodicity.

29 Claims, 15 Drawing Sheets

(51) Int. Cl.
*H04W 72/23* (2023.01)
*H04W 72/11* (2023.01)

(56) References Cited

U.S. PATENT DOCUMENTS

| | | | | |
|---|---|---|---|---|
| 2021/0051634 | A1* | 2/2021 | Fakoorian | H04L 1/1812 |
| 2021/0136830 | A1* | 5/2021 | Lin | H04W 72/23 |
| 2021/0144749 | A1* | 5/2021 | Baek | H04L 5/0044 |
| 2021/0144750 | A1* | 5/2021 | Cao | H04W 72/0453 |
| 2021/0160879 | A1* | 5/2021 | Lin | H04L 1/0003 |
| 2021/0352640 | A1* | 11/2021 | Fan | H04L 5/0094 |
| 2021/0400714 | A1* | 12/2021 | Huang | H04L 1/1896 |
| 2022/0149997 | A1* | 5/2022 | Wang | H04L 1/1864 |
| 2022/0167362 | A1* | 5/2022 | Liu | H04W 72/542 |
| 2022/0209906 | A1* | 6/2022 | Han | H04W 72/23 |
| 2022/0210823 | A1* | 6/2022 | Alfarhan | H04L 1/1887 |
| 2022/0217715 | A1* | 7/2022 | Bae | H04W 72/21 |
| 2022/0256562 | A1* | 8/2022 | Behravan | H04W 72/569 |
| 2022/0304010 | A1* | 9/2022 | Han | H04W 72/0446 |
| 2022/0312412 | A1* | 9/2022 | Lee | H04W 72/0446 |
| 2022/0312459 | A1* | 9/2022 | Yang | H04L 1/0075 |
| 2022/0377785 | A1* | 11/2022 | Yao | H04W 72/23 |
| 2023/0049937 | A1* | 2/2023 | Takahashi | H04W 72/231 |
| 2023/0155744 | A1* | 5/2023 | Bae | H04L 1/1887 370/280 |
| 2023/0209507 | A1* | 6/2023 | Liu | H04W 72/02 370/329 |
| 2023/0309086 | A1* | 9/2023 | Ko | H04W 76/14 370/329 |
| 2023/0309090 | A1* | 9/2023 | Bae | H04L 1/1812 |

OTHER PUBLICATIONS

Nokia, et al., "Further Discussion on CG Periodicities and CG and SPS Occasions Determination for New Periodicities", 3GPP Draft, R2-1915693, 3GPP TSG-RAN WG2 Meeting #107bis, 3rd Generation Partnership Project (3GPP), Mobile Competence Centre, vol. RAN WG2, No. Chongging, China, Oct. 14, 2019-Oct. 18, 2019, Nov. 7, 2019 (Nov. 7, 2019, XP051816068, 5 Pages, Retrieved from Internet: URL:https://ftp.3gpp.org/tsg_ran/WG2_RL2/TSGR2_108/Docs/R2-1915693.zip, [retrieved on Nov. 7, 2019] paragraph [0001]-paragraph [0002].

Nokia, et al., "NR Support for TSN Traffic Patterns", 3GPP Draft, R2-1817270, 3GPP TSG-RAN WG2 Meeting #104, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018 (Nov. 12, 2018), XP051556806, 9 Pages, Retrieved from the Internet: URL: http://www.3gpp.org/ftp/Meettings%5F3GPP%5FSYNC/RAN2/Docs/R2%2D1817270%2Ezip [retrieved on Nov. 12, 2018] paragraph [0002].

Nokia, et al., "Support for Arbitrary TSC Message Periodicities", 3GPP Draft, R2-1913453, 3GPP TSG-RAN WG2 Meeting #107bis, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 3, 2019 (Oct. 3, 2019), XP051804268, 9 Pages, Retrieved from the Internet: URL:https://ftp.3gpp.org/tsg_ran/WG2_RL2/TSGR2_107bis/Docs/R2-1913453 [retrieved on Oct. 3, 2019] Paragraph [0001]-Paragraph [0003].

NTT Docomo, Inc: "Summary of 7.2.6.6 Enhanced UL Configured Grant Transmission", 3GPP Draft, R1-1905609, 3GPP TSG RAN WG1 Meeting #96bis, 3rd Generation Partnership Project (3GPP), Mobile Competence Centre, vol. RAN WG1, No. Xi'an, China, Apr. 8, 2019-Apr. 12, 2019, Apr. 10, 2019 (Apr. 10, 2019), XP051707667, 38 Pages, Retrieved from the Internet: URL:http://www.3gpp.org/ftp/tsg%5Fran/WG1%5FRL1/TSGR1%5F96b/Docs/R1%2D19105609%2Ezip [retrieved on Apr. 4. 2019] paragraph [0002]-paragraph [0003] paragraph [0007].

Partial International Search Report—PCT/US2021/046712—ISA/EPO—Dec. 14, 2021.

International Search Report and Written Opinion—PCT/US2021/046712—ISA/EPO—Feb. 4, 2022.

European Search Report—EP23204022—Search Authority—The Hague—Feb. 20, 2024.

Intel Corporation: "Uplink Grant Free Transmission for URLLC Services", 3GPP TSG RAN1 WG Meeting #88, R1-1702242 Intel-URLLC_UL_GF, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017—Feb. 17, 2017, Feb. 12, 2017, pp. 1-7, XP051209400, para [02.3]—para[02.4].

Sequans Communications: "Impact of CG/SPS With Periodicities Non Dividing HF Length", 3GPP TSG-RAN WG2 Meeting #109-e, R2-2001627, 3rd Generation Partnership Project, Mobile Competence Centre, 650, Route Des Lucioles, F-06921 Sophia-Antipolis Cedex, France, vol. RAN WG2, No. Elbonia, Feb. 24, 2020—Mar. 6, 2020, Feb. 14, 2020, 7 Pages, XP051849918, paragraph [6.3.2].

ZTE: "Enhanced for UL Grant Free Transmission", 3GPP TSG RAN WG1 #97, R1-1906414, 3rd Generation Partnership Project, Mobile Competence Centre, 650, Route Des Lucioles, F-06921 Sophia-Antipolis Cedex, France, vol. RAN WG1, No. Reno, USA, May 13, 2019—May 17, 2019, May 3, 2019, 4 Pages, XP051708449, para [0002]—para[0004].

\* cited by examiner

SPS AND ULCG ENHANCEMENTS

CROSS REFERENCE TO RELATED APPLICATION(S)

This application claims the benefit of and priority to U.S. Provisional Application Ser. No. 63/069,652, entitled "SPS and ULCG Enhancements" and filed on Aug. 24, 2020, which is expressly incorporated by reference herein in its entirety.

TECHNICAL FIELD

The present disclosure relates generally to communication systems, and more particularly, to a configuration to enhance semi-persistent scheduling (SPS) and uplink configured grant (CG) in wireless communication systems

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives, from a base station, a configuration for a periodicity for a configured grant, the configured grant being for communicating with the base station based on the corresponding periodicity. The apparatus communicates with the base station based on the configured periodicity in association with the configured grant, the communicating being one of receiving a plurality of physical downlink shared channels (PDSCHs) associated with the configured grant based on the corresponding configured periodicity or transmitting a plurality of physical uplink shared channels (PUSCHs) associated with the configured grant based on the corresponding configured periodicity. The configured periodicity is one of a non-integer multiple or non-integer fraction of a slot.

In an aspect of the disclosure, a method, a computer-readable medium, and an apparatus are provided. The apparatus may be a device at a UE. The device may be a processor and/or a modem at a UE or the UE itself. The apparatus receives, from a base station, a configuration for a periodicity for at least one configured grant, each of the at least one configured grant being for communicating with the base station based on the corresponding periodicity. The apparatus communicates with the base station based on the configured periodicity in association with each of the at least one configured grant, the communicating being one of receiving a plurality of PDSCHs associated with each of the at least one configured grant based on the corresponding configured periodicity or transmitting a plurality of PUSCHs associated with each of the at least one configured grant based on the corresponding configured periodicity. The configured periodicity is one of an integer multiple of a slot with an occasion pattern within the periodicity including at least two occasions with different numbers of slots, or a set of periodicities for a set of interlaced semi-persistent schedulings (SPSs) or uplink configured grants (ULCGs) where at least two of the periodicities are the same.

In an aspect of the disclosure, a method, a computer-readable medium, and an apparatus are provided. The apparatus may be a device at a base station. The device may be a processor and/or a modem at a base station or the base station itself. The apparatus transmits, to a UE, a configuration for a periodicity for a configured grant, the configured grant being for communicating with the UE based on the corresponding periodicity. The apparatus communicates with the UE based on the configured periodicity in association with the configured grant, the communicating being one of transmitting a plurality of PDSCHs associated with the configured grant based on the corresponding configured periodicity or receiving the plurality of PUSCHs associated with the configured grant based on the corresponding configured periodicity. The configured periodicity is one of a non-integer multiple or non-integer fraction of a slot.

In an aspect of the disclosure, a method, a computer-readable medium, and an apparatus are provided. The apparatus may be a device at a base station. The device may be a processor and/or a modem at a base station or the base station itself. The apparatus transmits, to a UE, a configuration for a periodicity for at least one configured grant, each of the at least one configured grant being for communicating with the UE based on the corresponding periodicity. The apparatus communicates with the UE based on the configured periodicity in association with each of the at least one configured grant, the communicating being one of transmitting a plurality of physical downlink shared channels (PDSCHs) associated with each of the at least one configured grant based on the corresponding configured periodicity or receiving a plurality of physical uplink shared channels (PUSCHs) associated with each of the at least one configured grant based on the corresponding configured periodicity. The configured periodicity is one of an integer multiple of a slot with an occasion pattern within the periodicity including at least two occasions with different numbers of slots, or a set of periodicities for a set of interlaced semi-persistent schedulings (SPSs) or uplink configured grants (ULCGs) where at least two of the periodicities are the same.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
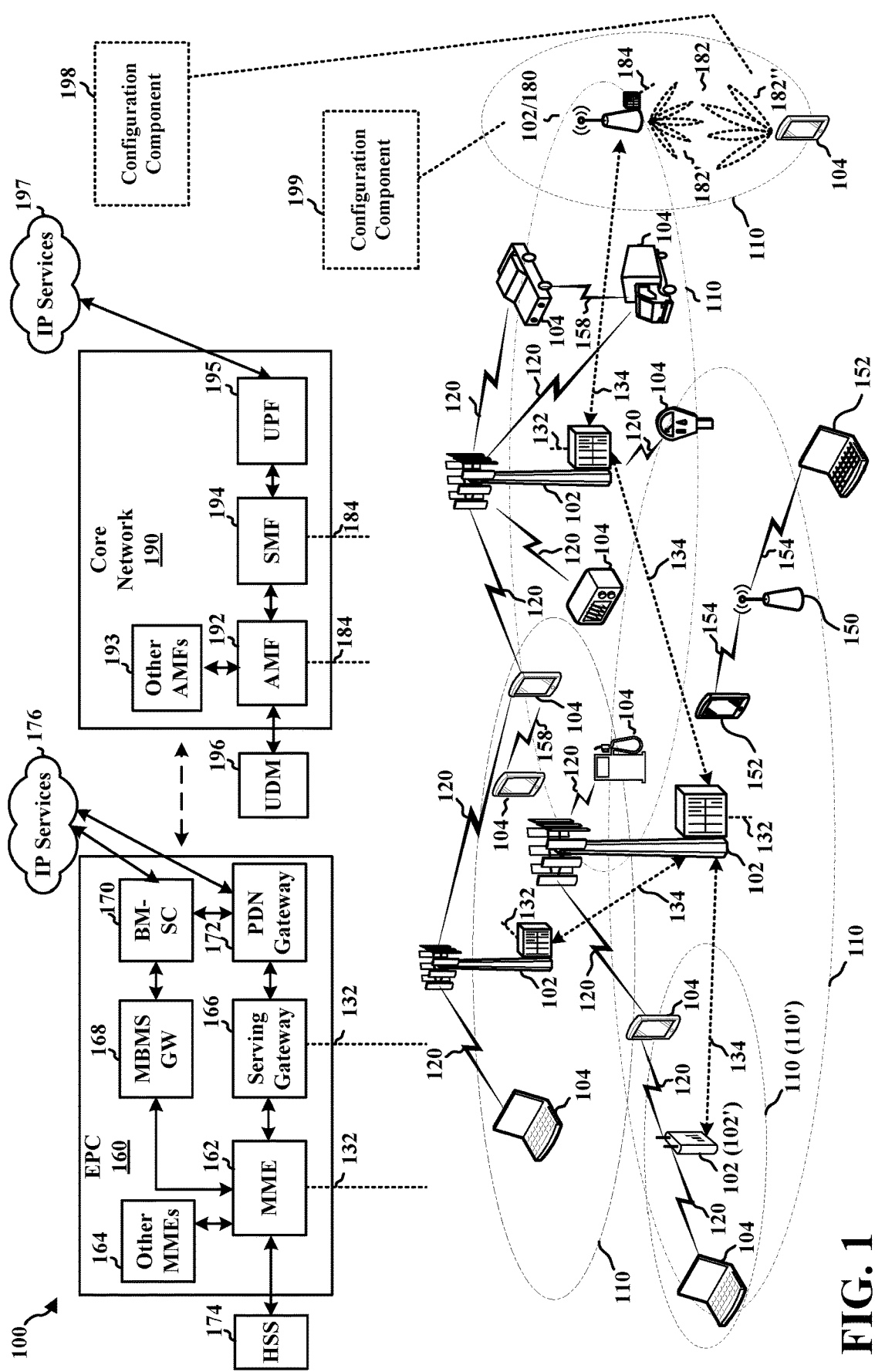
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to utilize grant periodicity values that are not multiples or fractions of a slot. For example, the UE 104 may comprise a configuration component 198 configured to receive a configuration for a periodicity for a configured grant. The UE 104 may receive, from a base station 180, a configuration for a periodicity for a configured grant, the configured grant being for communicating with the base station based on the corresponding periodicity. The UE 104 may communicate with the base station based on the configured periodicity in association with the configured grant, the communicating being one of receiving a plurality of physical downlink shared channels (PDSCHs) associated with the configured grant based on the corresponding configured periodicity or transmitting a plurality of physical uplink shared channels (PUSCHs) associated with the configured grant based on the corresponding configured periodicity, wherein the configured periodicity is one of a non-integer multiple or non-integer fraction of a slot.

Referring again to FIG. 1, in certain aspects, the base station 180 may be configured to configure a UE to utilize periodicity values that are not multiples or fractions of a slot. For example, base station 180 may comprise a configuration component 199 configured to transmit a configuration for a periodicity for a configured grant. The base station 180 transmits, to the UE 104, a configuration for a periodicity for a configured grant, the configured grant being for communicating with the UE 104 based on the corresponding periodicity. The base station 180 communicates with the UE 104 based on the configured periodicity in association with the configured grant, the communicating being one of transmitting a plurality of PDSCHs associated with the configured grant based on the corresponding configured periodicity or receiving the plurality of PUSCHs associated with the configured grant based on the corresponding configured periodicity, wherein the configured periodicity is one of a non-integer multiple or non-integer fraction of a slot.

Although the following description may be focused on 5G NR, the concepts described herein may be applicable to other similar areas, such as LTE, LTE-A, CDMA, GSM, and other wireless technologies.

Figure 2:
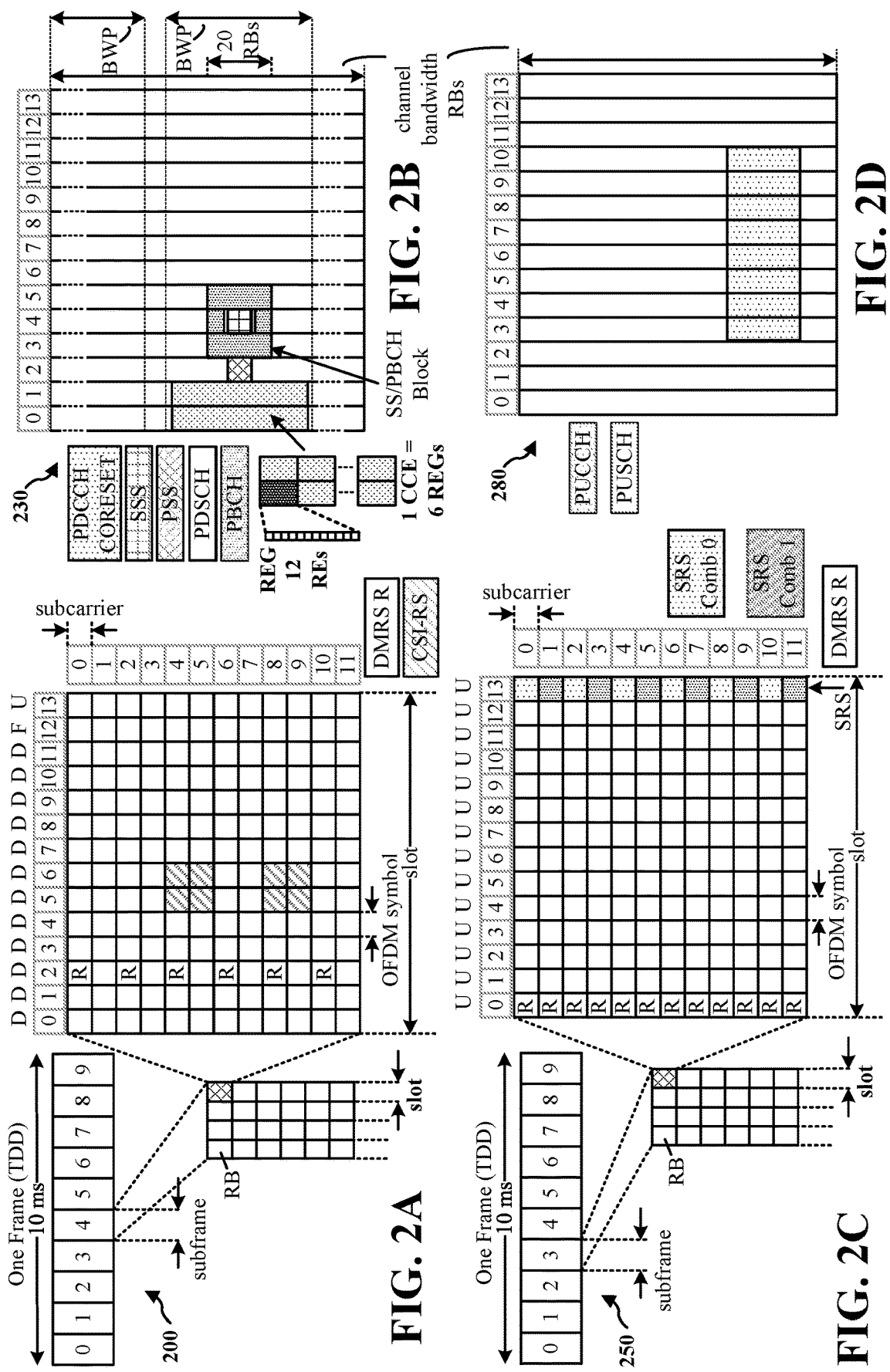
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
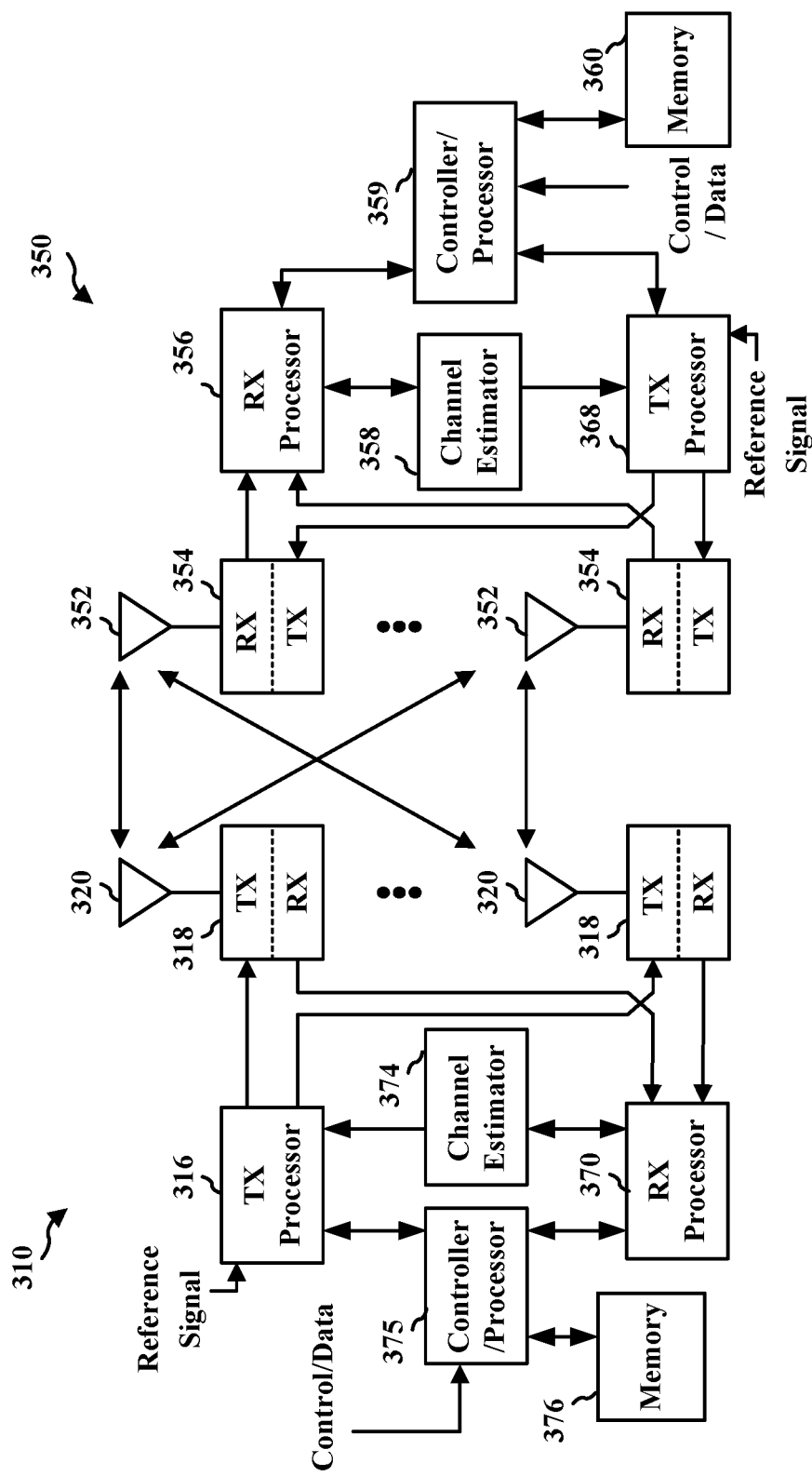
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Wireless communication systems, such as but not limited to 5G NR, may support SPS in the downlink and ULCG in the uplink to serve periodic traffic. Two types of ULCGs are supported in NR, Type 1 and Type 2. In Type 1, all the parameters are configured via RRC for PUSCH transmissions, and does not need to be activated. In Type 2, RRC signaling configures the grant with a set of transmission parameters. The transmissions may be activated, reactivated, or released by DCI.

The frame/slot structure of NR is configured to include 100 frames in 1 second, and 10/20/40/80 slots in a frame, depending on the subcarrier spacing (e.g., 15, 30, 60, 120 kHz, respectively). For downlink SPS, the minimum periodicity may comprise 1 slot. For ULCG, the minimum periodicity may comprise 2 symbols. Some wireless systems, such as extended reality (XR) and time-sensitive networking (TSN) have periodicities that are not multiples of slots of NR. For example, XR has a periodicity of 1/60 seconds or 1/120 seconds (e.g., 60/120 packets per second), but the periodicity for SPS and ULCG in NR do not align with the traffic arrival of XR. TSN has a similar traffic arrival pattern, as XR, (e.g., 120 packets per second), but has a tighter latency. A periodicity of 1/120 seconds is equivalent to 8.3333 slots, and if data is arriving with a gap 8.3333 slots, then the periodicity should be aligned with the slots, otherwise for some packets of data may have to wait a certain amount of time before the UE can get an opportunity to transmit or receive the packet of data, which may result in a delay. The delay occurs because the periodicity of transmission occasions is not aligned with the incoming traffic.

Aspects presented herein provide a configuration for configured grant periodicity values that are not multiples or fractions of a slot. Configuring the values of grant periodicity to not be multiples or fractions of a slot may allow for the periodicity to be aligned with the traffic.

In some instances, a configured grant (e.g., SPS or ULCG) may have periodicity values that are not multiples or fractions of a slot. The periodicity may be configured in terms of a combination of slots and symbols. For example, a periodicity may have X slot+Y symbols. In some aspects, setting the values as X=8 and Y=4 may be used to support 120 packets per second. In some aspects, the periodicity may be configured based on time. For example, a periodicity may be set as 1/Z seconds, where Z may be set to 60 or 120. In such instances, the UE may take a first activated or configured grant occasion as a reference point, and then determine a starting symbol of the k-th PDSCH or PUSCH to be $$\text{Round}\left(\frac{(K-1)N_{symbol}^{second}}{Z}\right)$$

after the first symbol of the first PDSCH or PUSCH. In some aspects, the UE may use the functions of Ceil( ) or Floor( ), instead of Round, of the ratio $$\frac{(K-1)N_{symbol}^{second}}{Z}$$

to determine the symbol index, where $N_{symbol}^{second}$ indicates a number of OFDM symbols in a second for the corresponding subcarrier spacing of the serving cell on which the configured grant (e.g., SPS or ULCG) is configured. In some aspects, the UE may determine the starting symbol of the k-th PDSCH or PUSCH to be the first symbol that is after (K−1)/Z second from the first symbol of the first PDSCH or PUSCH in the SPS or ULCG configuration. In such instances, the UE may determine the first symbol of the k-th PDSCH/PUSCH to be $$\text{Ceil}\left(\frac{(K-1)N_{symbol}^{second}}{Z}\right)$$

after the first symbol of the first PDSCH/PUSCH. In some aspects, the UE may determine the first symbol of the k-th PDSCH/PUSCH to be $$\text{Round}\left(\frac{N_{symbol}^{second}}{Z}\right)$$

symbols after the first symbol of the (K−1)-th PDSCH/PUSCH (e.g., the previous transmission/reception opportunity). As such, the UE may be configured to determine the k-th PDSCH/PUSCH from the (K−1)-th PDSCH/PUSCH. In some aspects, the UE may use the functions of Ceil( ) or Floor( ), instead of Round, of the ratio $$\frac{N_{symbol}^{second}}{Z}$$

to determine the first symbol index of the k-th PDSCH/PUSCH from the (K−1)-th PDSCH/PUSCH (e.g., the previous transmission/reception opportunity).

Figure 4:
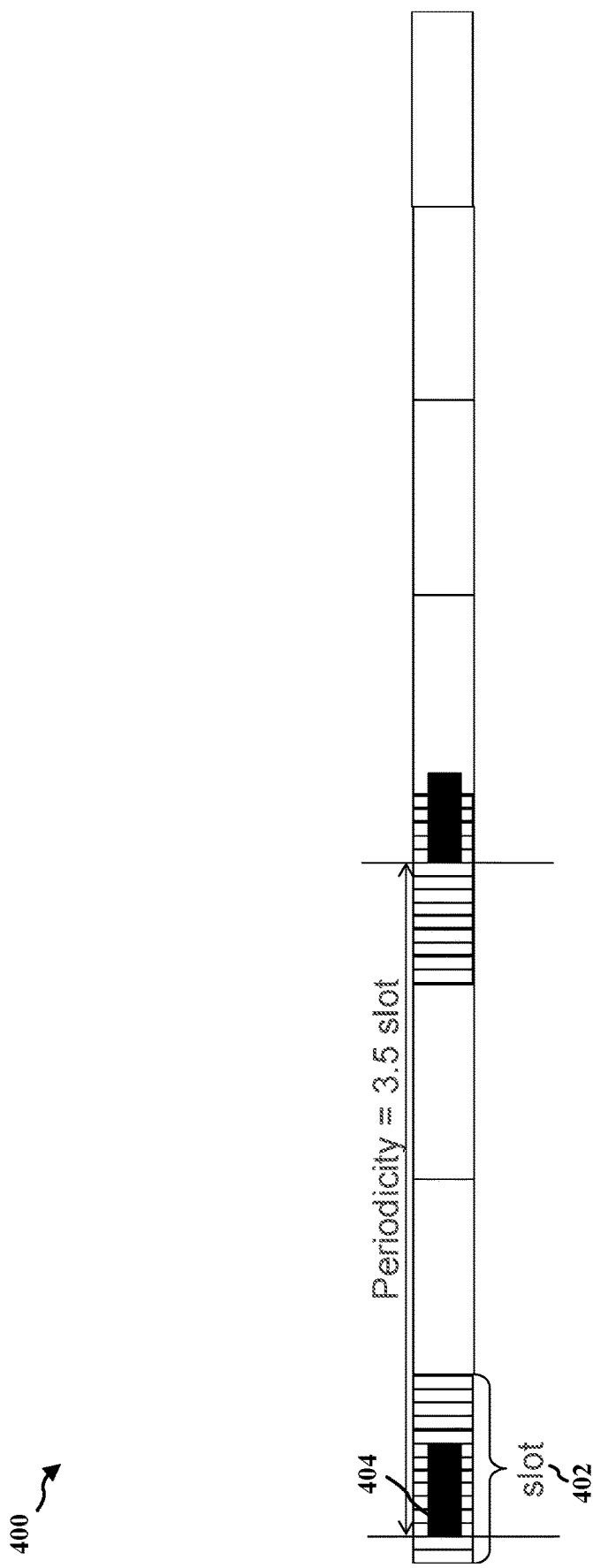
FIG. 4 illustrates an example of a grant configuration.

FIG. 4 is an example 400 of a grant configuration. The base station may configure a grant via RRC signaling. The base station may indicate, via DCI, a slot 402 in which the UE receives or transmits the first transmission. In the example 400 of FIG. 4, the slot 402 may be the first slot where the sequence of SPS or ULCG occasions may start. The base station may also indicate the time domain resource allocation 404 (e.g., ULCG PUSCH or SPS PDSCH transmission) within the slot. The slot 402 may comprise 14 OFDM symbols. In the example 400, the time domain resource allocation 404 may start at symbol 2, such that the first transmission or reception occurs at symbol 2, and may have a length of 7 symbols for example. If the periodicity is not in multiples of slots, then in the next occasion the start of the next PDSCH or PUSCH transmission will not be in the same symbol as the first PDSCH or PUSCH transmission. In the example 400 of FIG. 4, the next transmission will start at symbol 9 and may end at symbol 15. However, the transmission opportunity will cross the slot boundary because symbol 15 is beyond the slot boundary.

In order to overcome the issue of transmission opportunity crossing the slot boundary due to the periodicities not being a multiple of slots, the UE may delay the PDSCH or PUSCH transmission to the next slot, and use the symbols as indicated by the starting and length indication (SLIV) in an activation DCI or in the RRC configuration in the corresponding slot. In some aspects, the UE may allow the ULCG PUSCH or SPS PDSCH transmission to reside across the slot boundary. In such instance, the PUSCH or PDSCH may be split into two PUSCHs or PDSCHs. Each of the two PUSCH or PDSCHs may carry the same transport block (TB) or data packet.

Figure 5:
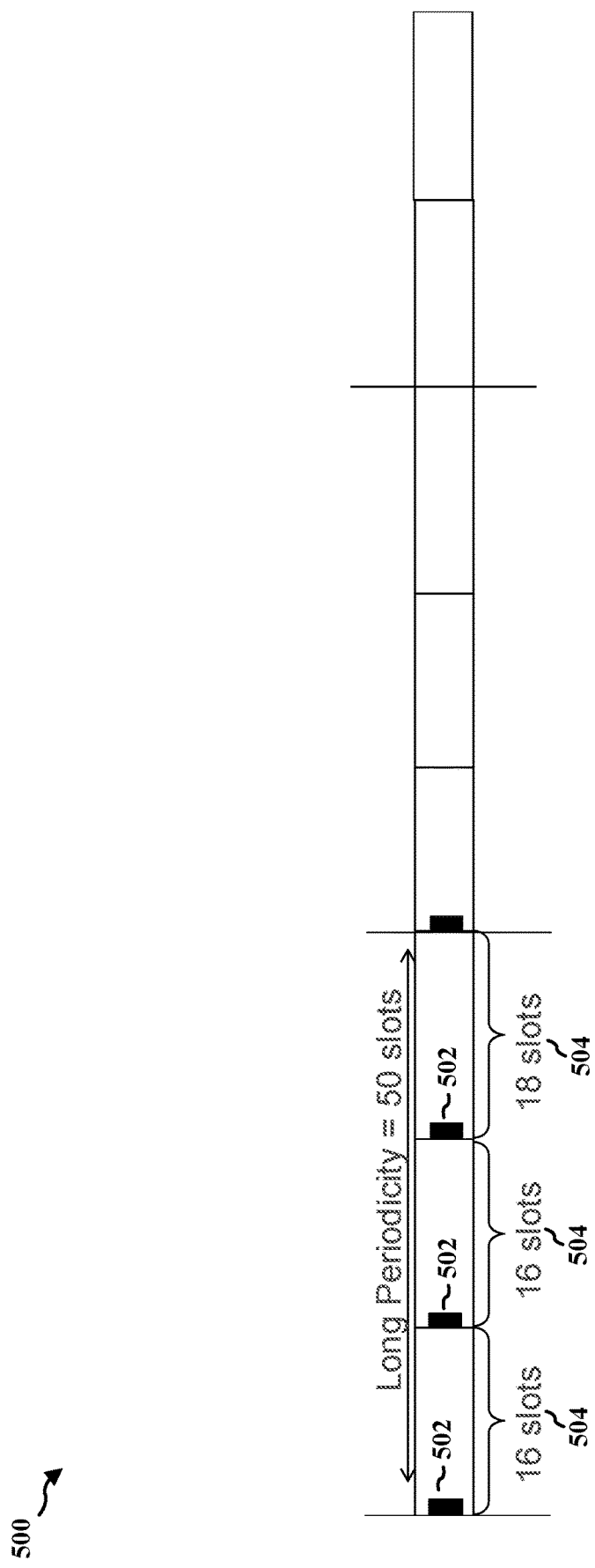
FIG. 5 illustrates an example of a grant configuration.

FIG. 5 is an example 500 of a grant configuration. When a base station configures the SPS or ULCG, the base station may configure SPS/ULCG occasions using a pattern and a long periodicity where multiple occasions 502 are within a long period. In the example 500 of FIG. 5, to support 120 packets per second on a 30 KHz subcarrier spacing (e.g., 0.5 ms in one slot), the base station may configure a longer period equal to 50 slots, and define three occasions 502 within the long period. The three occasions may have gaps of 16, 16, 18 slots, respectively. This can be defined by specifying the first occasion (e.g., with slot offset indicated in the activation DCI) and configuring the gap between the first and second occasion, and the gap between the second and third occasion via RRC signaling. For example, the base station may configure a gap parameter (e.g., 16 slots), and the UE may apply the same gap for all of the PUSCH/PDSCH occasions within the long period. The base station may also configure the number of occasions in each long period. In another example, the base station may configure the gap between a first occasion and a second occasion, and configure the gap between the second occasion and the third occasion separately. These gaps may comprise the same or different values (e.g., a gap of 16 slots between the first occasion and second occasion, and a gap of 17 slots between the second occasions and the third occasion). In some aspects, the base station may define a slot index or slot offset of the three occasions within the long period. The example 500 of FIG. 5 includes three occasions 502 within three slots 504, but the disclosure is not intended to be limited to the aspects disclosed herein. In some aspects, the amount of occasions may be greater than or less than three, while the amount of slots may be greater than or less than three.

Figure 6:
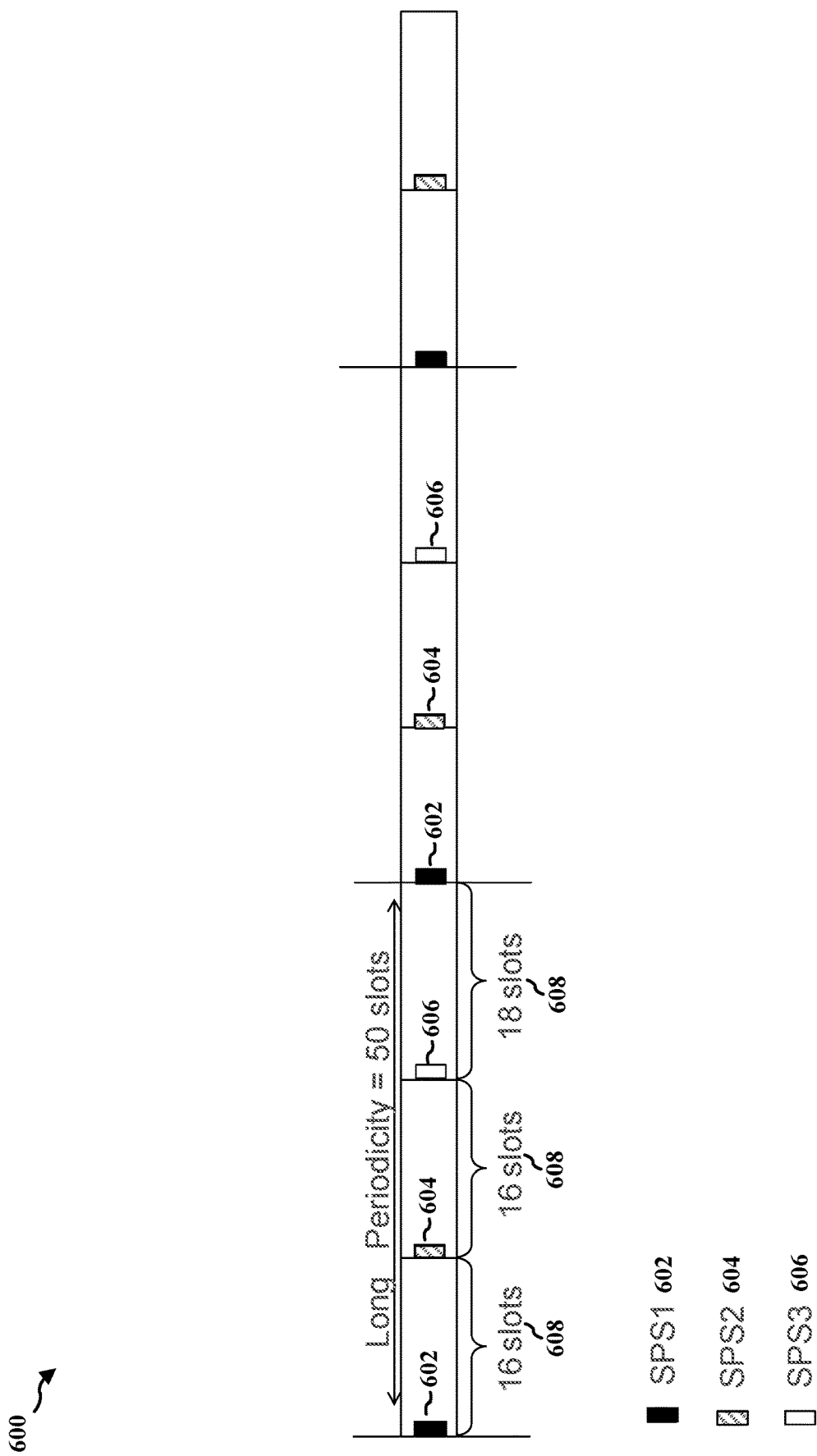
FIG. 6 illustrates an example of multiple grant configuration.

FIG. 6 is an example 600 of a grant configuration. The base station may configure multiple SPS/ULCG configurations (e.g., 602, 604, 606), each with a long periodicity and a different starting offset. The multiple SPS/ULCGs may be configured to share several parameters in the configuration (e.g., periodicity, PUCCH resource for HARQ-ACK feedback, MIMO schemes, demodulation reference signal (DMRS) configurations, etc.). The multiple SPS/ULCGs sharing several parameters may be for a set of interlaced SPS/ULCGs. In some aspects, a DCI may be configured to jointly activate or release the SPS/ULCG configurations. The DCI jointly activating or releasing the SPS/ULCG configurations allows for the SPS/ULCG configurations to serve the same traffic. For example, in the example 600 of FIG. 6, the base station when activating SPS1 602 should also activate SPS2 604 and SPS3 606. In the example 600 of FIG. 6, three SPS may be configured by the base station (e.g., SPS1 602, SPS2 604, SPS3 606) and may have an offset 608 to be 16 slots, 16 slots, 18 slots, respectively. In some aspects, such as in instances where multiple SPS configurations may be activated by the same activation DCI, the UE may apply the same set of parameters indicated in the control fields in the DCI to all of the SPS configurations. In some aspects, the control fields may include the frequency domain resource allocation, the time domain resource allocation, the MIMO scheme, the DMRS/PTRS configuration, antenna ports, precoder, or k1 (PDSCH-to-HARQ-ACK timing). The control fields may include other parameters or settings and the disclosure is not intended to be limited to the aspects disclosed herein. The example 600 of FIG. 6 includes three SPS occasions within three slots, but the disclosure is not intended to be limited to the aspects disclosed herein. In some aspects, the amount of SPS or ULCG occasions may be greater than or less than three, while the amount of slots may be greater than or less than three.

Figure 7:
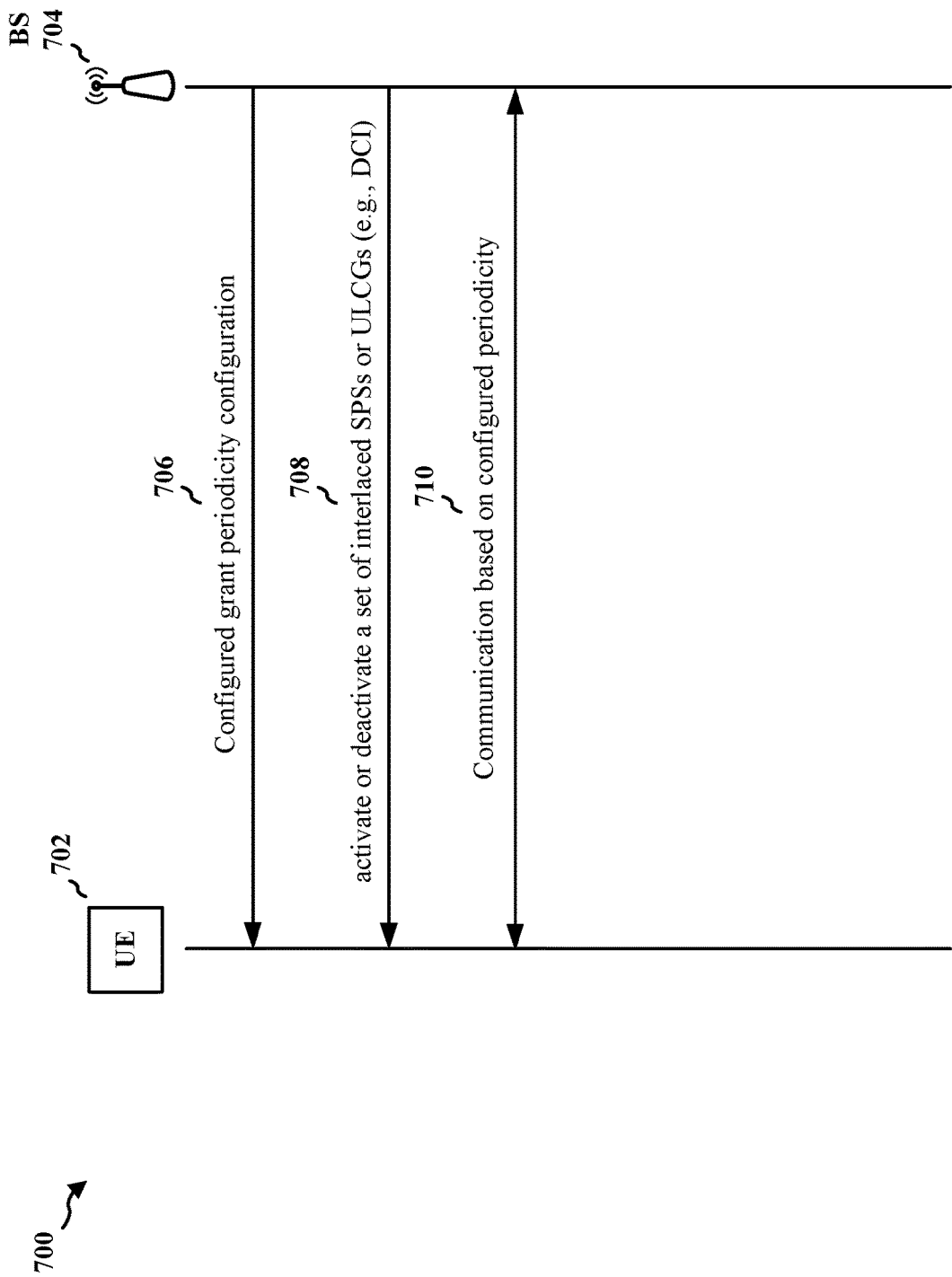
FIG. 7 is a call flow diagram of signaling between a UE and a base station in accordance with certain aspects of the disclosure.

FIG. 7 is a call flow diagram 700 of signaling between a UE 702 and a base station 704. The base station 704 may be configured to provide a cell. The UE 702 may be configured to communicate with the base station 704. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to base station 310 and the UE 702 may correspond to UE 350.

As illustrated at 706, the base station 704 transmit a configuration for a periodicity for a configured grant. The base station 704 may transmit the configuration for the periodicity for the configured grant to the UE 702. The UE 702 may receive the configuration for the periodicity for the configured grant from the base station 704. The configured grant may be for communicating with the UE 702 based on the corresponding periodicity. In some aspects, the configured grant comprises a ULCG. The ULCG may be for receiving a plurality of PUSCHs from the UE 702 based on the corresponding periodicity. The ULCG may be for the UE 702 transmitting the plurality of PUSCHs to the base station 704 based on the corresponding periodicity. The configured grant may comprise at least one SPS. The SPS may be for transmitting a plurality of PDSCHs to the UE 702 based on the corresponding periodicity. The SPS may be for the UE 702 receiving the plurality of PDSCHs from the base station 704 based on the corresponding periodicity.

In some aspects, the base station 704 may transmit a configuration for a periodicity for at least one configured grant. The base station 704 may transmit the configuration for the periodicity for the at least one configured grant to the UE 702. The UE 702 may receive the configuration for the periodicity for the at least one configured grant from the base station 704. Each of the at least one configured grant may be for communicating with the UE 702 based on the corresponding periodicity. In some aspects, the at least one configured grant may comprise at least one ULCG. Each of the at least one ULCG may be for receiving the plurality of PUSCHs transmitted by the UE 702 based on the corresponding periodicity. Each of the at least one ULCG may be for the UE 702 transmitting the plurality of PUSCHs to the base station 704 based on the corresponding periodicity. In some aspects, the at least one configured grant may comprise at least one SPS. Each of the at least one SPS may be for transmitting, by the base station 704, the plurality of PDSCHs to the UE 702 based on the corresponding periodicity. Each of the at least one SPS may be for receiving, by the UE 702, a plurality of PDSCHs transmitted from by the base station 704 based on the corresponding periodicity.

As illustrated at 708, the base station 704 may transmit DCI, to the UE 702, to activate or deactivate a set of interlaced SPSs or ULCGs. The UE 702 may receive DCI, from the base station 704, to activate or deactivate a set of interlaced SPSs or ULCGs. The DCI may be configured to jointly activate or deactivate the set of interlaced SPSs or ULCGs with the same periodicities.

As illustrated at 710, the base station 704 and UE 702 may communicate with each other based on the configured periodicity. The communication may be one of transmitting, to the UE 702, a plurality of PDSCHs associated with the configured grant based on the corresponding configured periodicity or receiving, from the UE 702, the plurality of PUSCHs associated with the configured grant based on the corresponding configured periodicity. The communication may be one of receiving, from the base station 704, a plurality of PDSCHs associated with the configured grant based on the corresponding configured periodicity or transmitting, to the base station 704, a plurality of PUSCHs associated with the configured grant based on the corresponding configured periodicity. The configured periodicity may be one of a non-integer multiple or non-integer fraction of a slot. In some aspects, the configured periodicity may include X slots and Y symbols, where X≥0 and 0<Y<14. In some aspects, the configured periodicity may be 1/Z seconds, where Z is an integer. A starting symbol may be determined based on 1/Z. The starting symbol may be rounded up or down to a symbol index based on 1/Z. The starting symbol of a first configured grant transmission may be based on the configured grant. In some aspects, Z=n*60, where n is an integer greater than or equal to 1. In some aspects, Z=n*30 or Z=n*90, where n is an integer greater than or equal to 1. In some aspects, the communicating with the base station 704 based on the configured periodicity may comprise delaying the communication, by the UE 702, until a next slot when the communication based on the configured periodicity extends across a slot boundary. In some aspects, the communicating with the UE 702 based on the configured periodicity may comprise receiving a delayed communication transmitted by the UE 702 in a next slot when the communication based on the configured periodicity extends across a slot boundary. In some aspects, the communication between the UE 702 and base station 704 based on the configured periodicity may comprise communicating in multiple adjacent slots when the communication based on the configured periodicity extends across a slot boundary. The multiple adjacent slots carrying a same TB or data packet.

In some aspects, the base station 704 and UE 702 may communicate with each other based on the configured periodicity in association with each of the at least one configured grant. The communication may be one of transmitting, by the base station 704, a plurality of PDSCHs, to the UE 702, associated with each of the at least one configured grant based on the corresponding configured periodicity or receiving, by the base station 704, a plurality of PUSCHs, from the UE 702, associated with each of the at least one configured grant based on the corresponding configured periodicity. The communication may be one of receiving, by the UE 702, a plurality of PDSCHs, from the base station 704, associated with each of the at least one configured grant based on the corresponding configured periodicity or transmitting, to the base station 704, a plurality of PUSCHs, from the UE 702, associated with each of the at least one configured grant based on the corresponding configured periodicity. The configured periodicity may be one of an integer multiple of a slot with an occasion pattern within the periodicity including at least two occasions with different numbers of slots, or a set of periodicities for a set of interlaced SPSs or ULCGs where at least two of the periodicities are the same. In some aspects, the configured periodicity may be an integer multiple of a slot with an occasion pattern within the periodicity including at least two occasions starting in different slots within each period. The base station 704 may transmit, to the UE 702, a slot indication of a first occasion. The UE 702 may receive, from the base station 704, the slot indication of the first occasion.

The UE 702 may determine a slot offset of a second occasion and a third occasion based on a configured slot offset and the slot indication of the first occasion. In some aspects, the configured periodicity may be a set of periodicities for a set of interlaced SPSs or ULCGs where at least two of the periodicities are the same.

Figure 8:
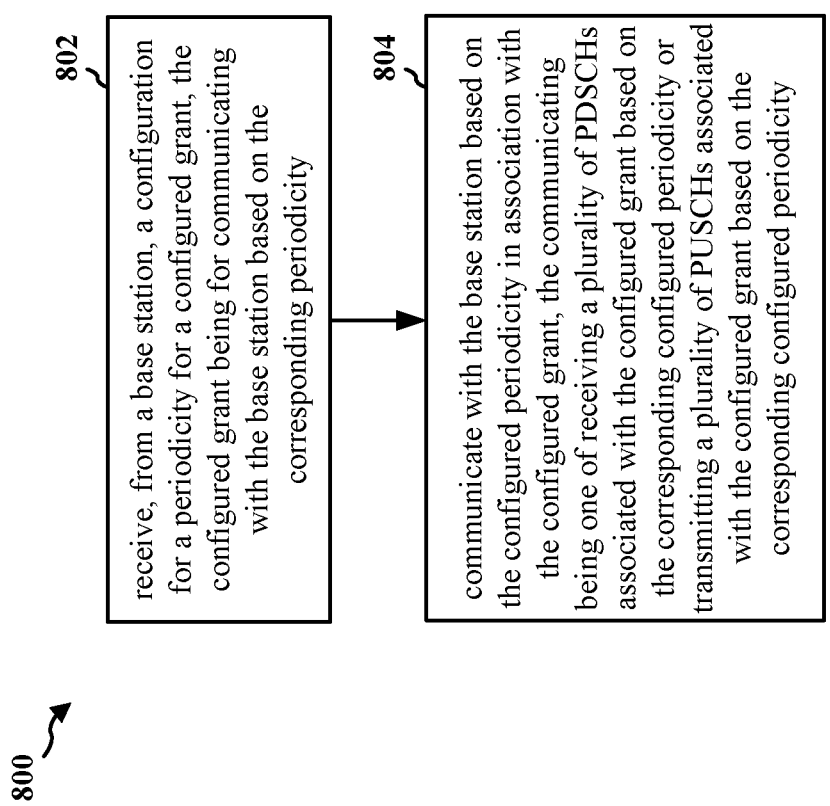
FIG. 8 is a flowchart of a method of wireless communication.

FIG. 8 is a flowchart 800 of a method of wireless communication. The method may be performed by a UE or a component of a UE (e.g., the UE 104, 702; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to utilize grant periodicity values that are not multiples or fractions of a slot.

At 802, the UE may receive a configuration for a periodicity for a configured grant. For example, 802 may be performed by configuration component 1140 of apparatus 1102. The UE may receive the configuration for a periodicity for a configured grant from a base station. The configured grant may be for communicating with the base station based on the corresponding periodicity. In some aspects, the configured grant comprises an uplink configured grant (ULCG). The ULCG may be for transmitting the plurality of PUSCHs based on the corresponding periodicity. In some aspects, the configured grant comprises at least one semi-persistent scheduling (SPS). The SPS may be for receiving the plurality of PDSCHs based on the corresponding periodicity.

At 804, the UE may communicate with the base station based on the configured periodicity in association with the configured grant. For example, 804 may be performed by communication component 1142 of apparatus 1102. The communication may be one of receiving a plurality of physical downlink shared channels (PDSCHs) associated with the configured grant based on the corresponding configured periodicity or transmitting a plurality of physical uplink shared channels (PUSCHs) associated with the configured grant based on the corresponding configured periodicity. The configured periodicity may be one of a non-integer multiple or non-integer fraction of a slot. In some aspects, the configured periodicity may include X slots and Y symbols, where $X \geq 0$ and $0 < Y < 14$. In some aspects, the configured periodicity may be $1/Z$ seconds, where Z is an integer. A starting symbol may be determined based on $1/Z$. The starting symbol may be rounded up or down to a symbol index based on $1/Z$. The starting symbol of a first configured grant transmission may be based on the configured grant. In some aspects, $Z=n*60$, where n is an integer greater than or equal to 1. In some aspects, $Z=n*30$ or $Z=n*90$, where n is an integer greater than or equal to 1. In some aspects, the communicating with the base station based on the configured periodicity may comprise delaying the communication until a next slot when the communication based on the configured periodicity extends across a slot boundary. In some aspects, the communicating with the base station based on the configured periodicity may comprise communicating in multiple adjacent slots when the communication based on the configured periodicity extends across a slot boundary. The multiple adjacent slots may carry a same transport block (TB) or data packet.

Figure 9:
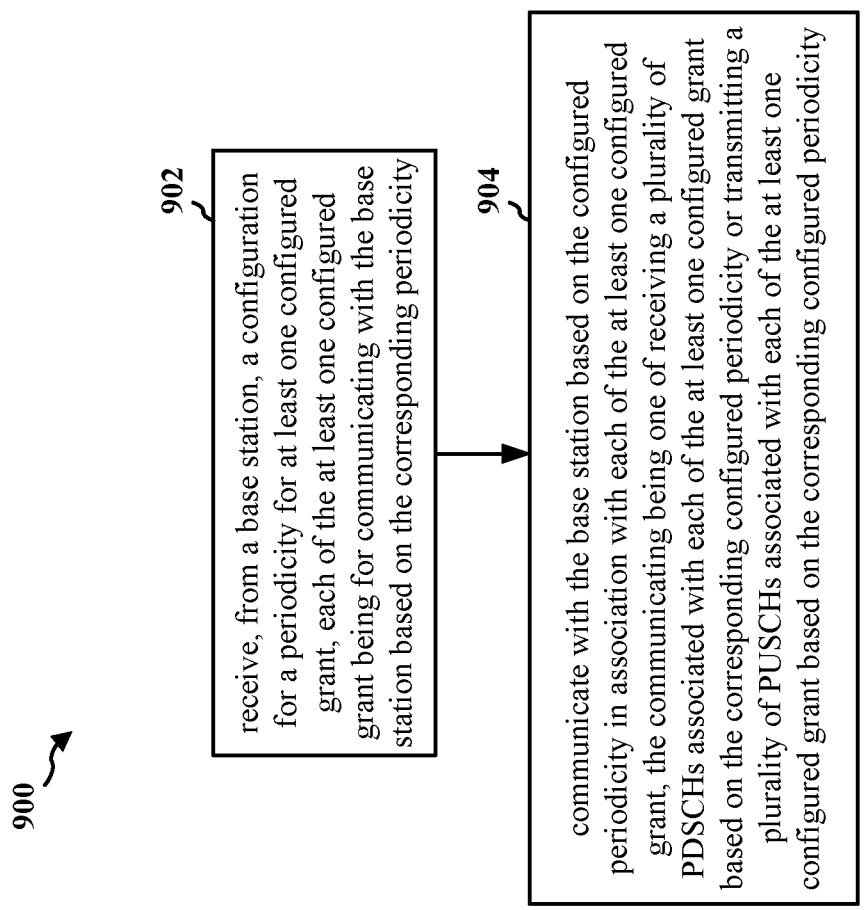
FIG. 9 is a flowchart of a method of wireless communication.

FIG. 9 is a flowchart 900 of a method of wireless communication. The method may be performed by a UE or a component of a UE (e.g., the UE 104, 702; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure grant occasions using a pattern where multiple occasions are within a long period.

At 902, the UE may receive a configuration for a periodicity for at least one configured grant. For example, 902 may be performed by configuration component 1140 of apparatus 1102. The UE may receive the configuration for a periodicity for at least one configured grant from a base station. Each of the at least one configured grant may be for communicating with the base station based on the corresponding periodicity. In some aspects, the at least one configured grant may comprise at least one uplink configured grant (ULCG). Each of the at least one ULCG may be for transmitting the plurality of PUSCHs based on the corresponding periodicity. In some aspects, the at least one configured grant may comprise at least one semi-persistent scheduling (SPS). Each of the at least one SPS may be for receiving a plurality of PDSCHs based on the corresponding periodicity.

At 904, the UE may communicate with the base station based on the configured periodicity in association with each of the at least one configured grant. For example, 904 may be performed by communication component 1142 of apparatus 1102. The communication may be one of receiving a plurality of PDSCHs associated with each of the at least one configured grant based on the corresponding configured periodicity or transmitting a plurality of PUSCHs associated with each of the at least one configured grant based on the corresponding configured periodicity. The configured periodicity may be one of an integer multiple of a slot with an occasion pattern within the periodicity including at least two occasions with different numbers of slots, or a set of periodicities for a set of interlaced SPSs or ULCGs where at least two of the periodicities are the same. In some aspects, the configured periodicity may be an integer multiple of a slot with an occasion pattern within the periodicity including at least two occasions starting in different slots within each period. The UE may receive, from the base station, a slot indication of a first occasion. The UE may determine a slot offset of a second occasion and a third occasion based on a configured slot offset and the slot indication of the first occasion. In some aspects, the configured periodicity may be a set of periodicities for a set of interlaced SPSs or ULCGs where at least two of the periodicities are the same.

Figure 10:
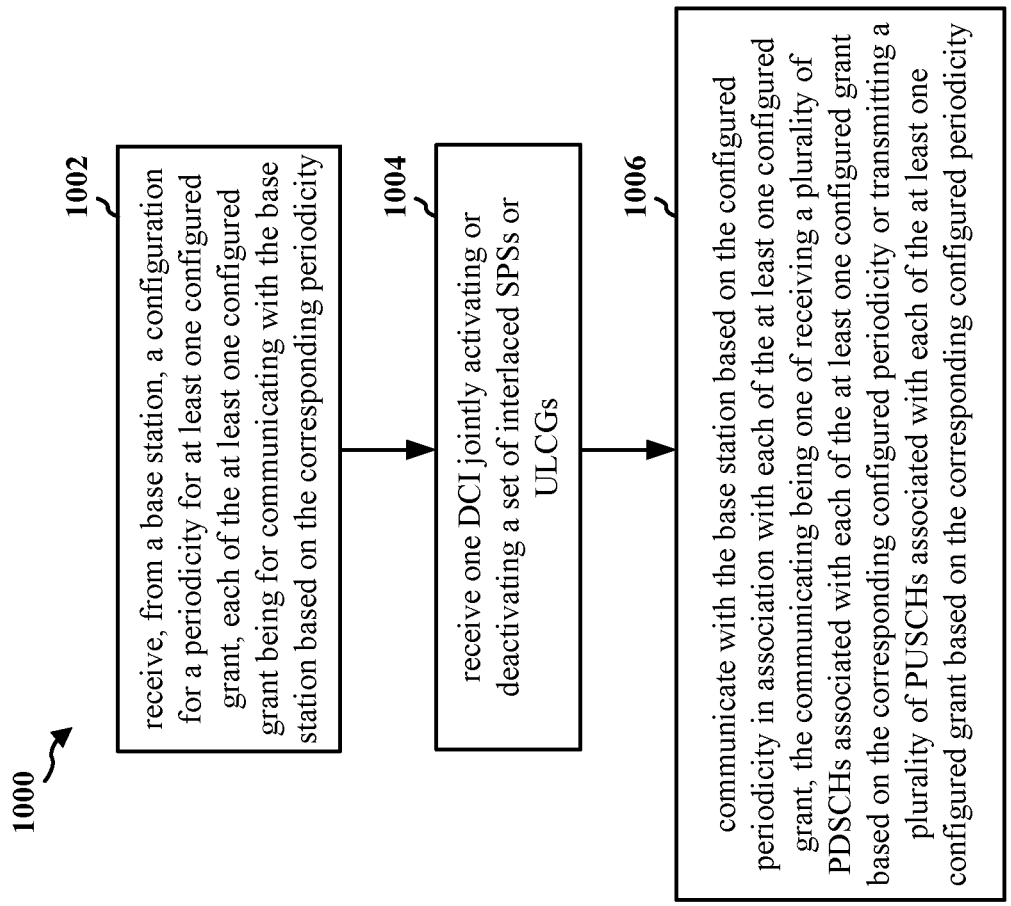
FIG. 10 is a flowchart of a method of wireless communication.

FIG. 10 is a flowchart 1000 of a method of wireless communication. The method may be performed by a UE or a component of a UE (e.g., the UE 104, 702; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure grant occasions using a pattern where multiple occasions are within a long period.

At 1002, the UE may receive a configuration for a periodicity for at least one configured grant. For example, 1002 may be performed by configuration component 1140 of apparatus 1102. The UE may receive the configuration for a periodicity for at least one configured grant from a base station. Each of the at least one configured grant may be for communicating with the base station based on the corresponding periodicity. In some aspects, the at least one configured grant may comprise at least one uplink configured grant (ULCG). Each of the at least one ULCG may be for transmitting the plurality of PUSCHs based on the corresponding periodicity. In some aspects, the at least one configured grant may comprise at least one semi-persistent scheduling (SPS). Each of the at least one SPS may be for receiving a plurality of PDSCHs based on the corresponding periodicity.

At 1004, the UE may receive DCI to activate or deactivate a set of interlaced SPSs or ULCGs. For example, 1004 may be performed by DCI component 1144 of apparatus 1102. The DCI may be configured to jointly activate or deactivate the set of interlaced SPSs or ULCGs with the same periodicities.

At 1006, the UE may communicate with the base station based on the configured periodicity in association with each of the at least one configured grant. For example, 1006 may be performed by communication component 1142 of apparatus 1102. The communication may be one of receiving a plurality of PDSCHs associated with each of the at least one configured grant based on the corresponding configured periodicity or transmitting a plurality of PUSCHs associated with each of the at least one configured grant based on the corresponding configured periodicity. The configured periodicity may be one of an integer multiple of a slot with an occasion pattern within the periodicity including at least two occasions with different numbers of slots, or a set of periodicities for a set of interlaced SPSs or ULCGs where at least two of the periodicities are the same. In some aspects, the configured periodicity may be an integer multiple of a slot with an occasion pattern within the periodicity including at least two occasions starting in different slots within each period. The UE may receive, from the base station, a slot indication of a first occasion. The UE may determine a slot offset of a second occasion and a third occasion based on a configured slot offset and the slot indication of the first occasion. In some aspects, the configured periodicity may be a set of periodicities for a set of interlaced SPSs or ULCGs where at least two of the periodicities are the same.

Figure 11:
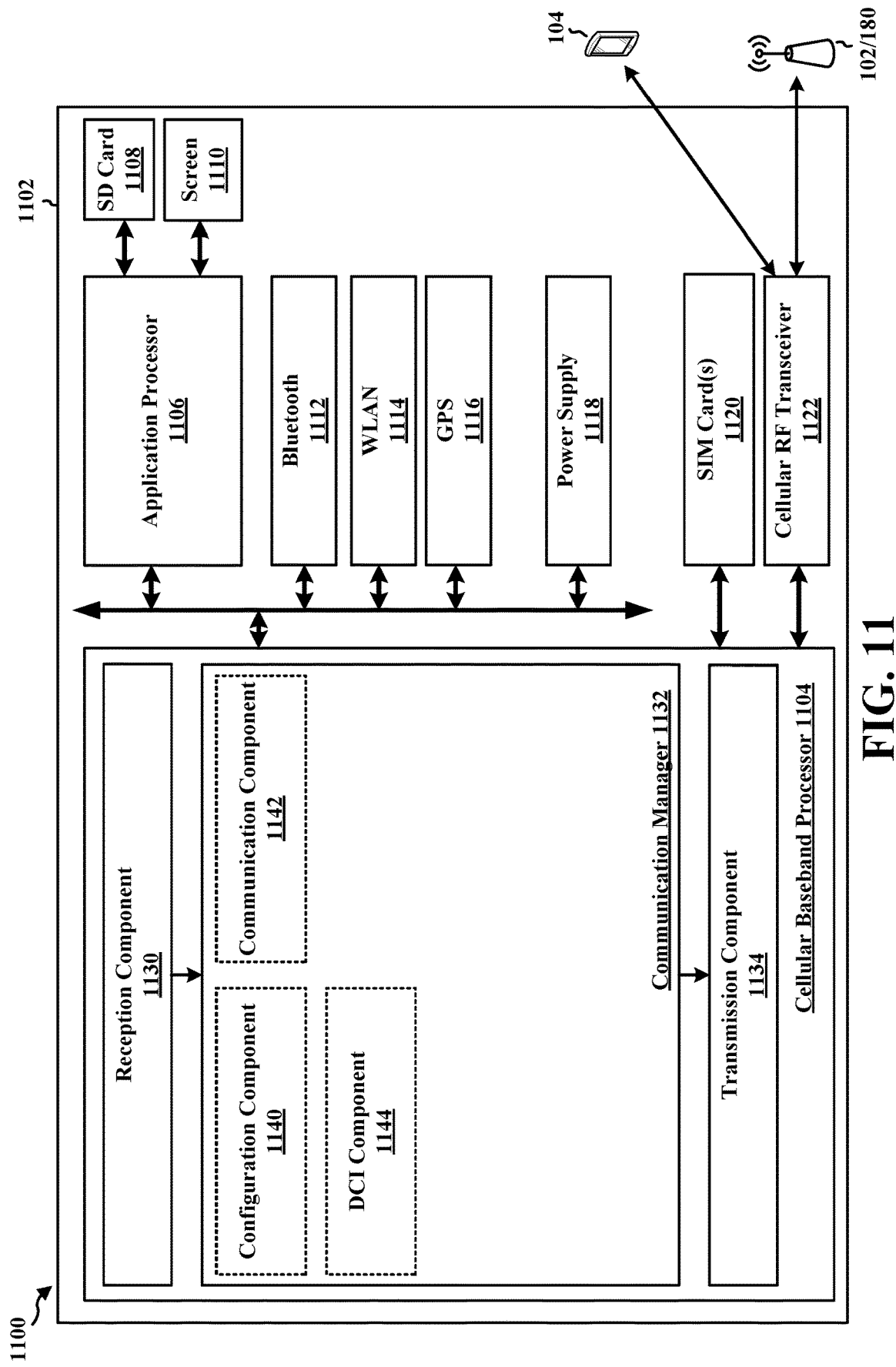
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a configuration component 1140 that is configured to receive a configuration for a periodicity for a configured grant, e.g., as described in connection with 802 of FIG. 8. The configuration component 1140 may be configured to receive a configuration for a periodicity for at least one configured grant, e.g., as described in connection with 902 of FIG. 9 or 1002 of FIG. 10. The communication manager 1132 further includes a communication component 1142 that is configured to communicate with the base station based on the configured periodicity in association with the configured grant, e.g., as described in connection with 804 of FIG. 8. The communication component 1142 may be configured to communicate with the base station based on the configured periodicity in association with each of the at least one configured grant, e.g., as described in connection with 904 of FIG. 9 or 1006 of FIG. 10. The communication manager 1132 further includes a DCI component 1144 that is configured to receive DCI to activate or deactivate a set of interlaced SPSs or ULCGs, e.g., as described in connection with 1004 of FIG. 10.

The apparatus may include additional components that perform each of the blocks of the algorithm in the flowcharts of FIGS. 8-10. As such, each block in the flowcharts of FIGS. 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, a configuration for a periodicity for a configured grant. The configured grant being for communicating with the base station based on the corresponding periodicity. The apparatus includes means for communicating with the base station based on the configured periodicity in association with the configured grant. The communicating being one of receiving a plurality of PDSCHs associated with the configured grant based on the corresponding configured periodicity or transmitting a plurality of PUSCHs associated with the configured grant based on the corresponding configured periodicity. The configured periodicity is one of a non-integer multiple or non-integer fraction of a slot. The apparatus includes means for receiving, from a base station, a configuration for a periodicity for at least one configured grant. Each of the at least one configured grant being for communicating with the base station based on the corresponding periodicity. The apparatus includes means for communicating with the base station based on the configured periodicity in association with each of the at least one configured grant. The communicating being one of receiving a plurality of PDSCHs associated with each of the at least one configured grant based on the corresponding configured periodicity or transmitting a plurality of PUSCHs associated with each of the at least one configured grant based on the corresponding configured periodicity. The configured periodicity is one of an integer multiple of a slot with an occasion pattern within the periodicity including at least two occasions with different numbers of slots, or a set of periodicities for a set of interlaced SPSs or ULCGs where at least two of the periodicities are the same. The apparatus further includes means for receiving DCI jointly activating or deactivating the set of interlaced SPSs or ULCGs with the same periodicities. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
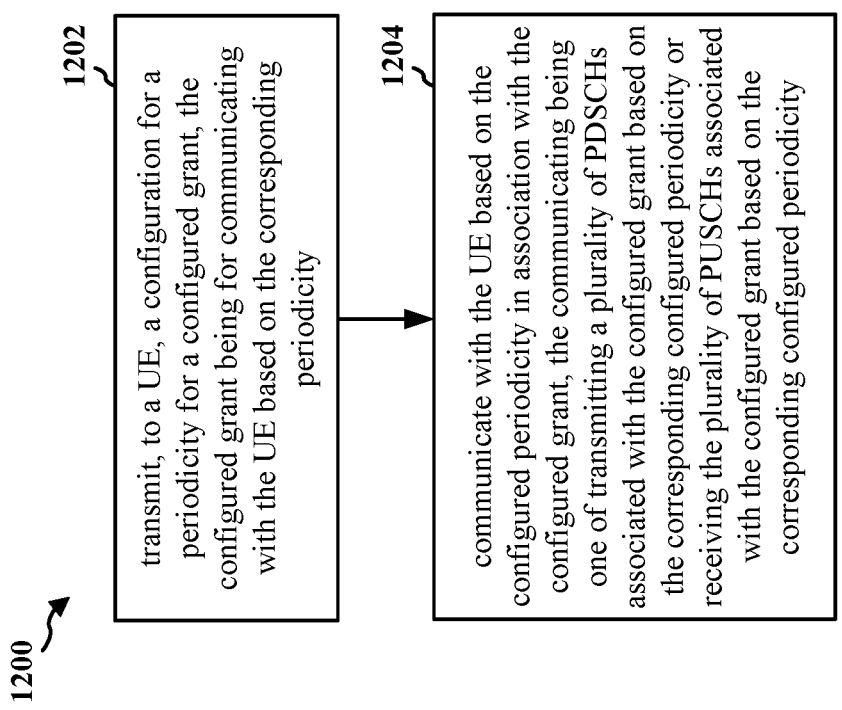
FIG. 12 is a flowchart of a method of wireless communication.

FIG. 12 is a flowchart 1200 of a method of wireless communication. The method may be performed by a base station or a component of a base station (e.g., the base station 102/180, 704; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to utilize periodicity values that are not multiples or fractions of a slot.

At 1202, the base station may transmit a configuration for a periodicity for a configured grant. For example, 1202 may be performed by configuration component 1540 of apparatus 1502. The base station may transmit the configuration for the periodicity for the configured grant to a UE. The configured grant may be for communicating with the UE based on the corresponding periodicity. In some aspects, the configured grant comprises a ULCG. The ULCG may be for receiving a plurality of PUSCHs based on the corresponding periodicity. The configured grant may comprise at least one SPS. The SPS may be for transmitting a plurality of PDSCHs based on the corresponding periodicity.

At 1204, the base station may communicate with the UE based on the configured periodicity. For example, 1204 may be performed by communication component 1542 of apparatus 1502. The communication may be one of transmitting a plurality of PDSCHs associated with the configured grant based on the corresponding configured periodicity or receiving the plurality of PUSCHs associated with the configured grant based on the corresponding configured periodicity. The configured periodicity may be one of a non-integer multiple or non-integer fraction of a slot. In some aspects, the configured periodicity may include X slots and Y symbols, where $X \geq 0$ and $0 < Y < 14$. In some aspects, the configured periodicity may be $1/Z$ seconds, where Z is an integer. A starting symbol may be determined based on $1/Z$. The starting symbol may be rounded up or down to a symbol index based on $1/Z$. The starting symbol of a first configured grant transmission may be based on the configured grant. In some aspects, the starting symbol may be rounded up or down to a symbol index based on $1/Z$ and the starting symbol of a previous configured grant transmission after a first configured grant transmission based on the configured grant. For example, the UE may determine the first symbol index of the k-th PDSCH/PUSCH from the (K−1)-th PDSCH/PUSCH (e.g., the previous transmission/reception opportunity). In some aspects, $Z=n*60$, where n is an integer greater than or equal to 1. In some aspects, $Z=n*30$ or $Z=n*90$, where n is an integer greater than or equal to 1. In some aspects, the communicating with the UE based on the configured periodicity may comprise receiving a delayed communication transmitted by the UE in a next slot when the communication based on the configured periodicity extends across a slot boundary. In some aspects, the communicating with the UE based on the configured periodicity may comprise communicating in multiple adjacent slots when the communication based on the configured periodicity extends across a slot boundary. The multiple adjacent slots carrying a same TB or data packet.

Figure 13:
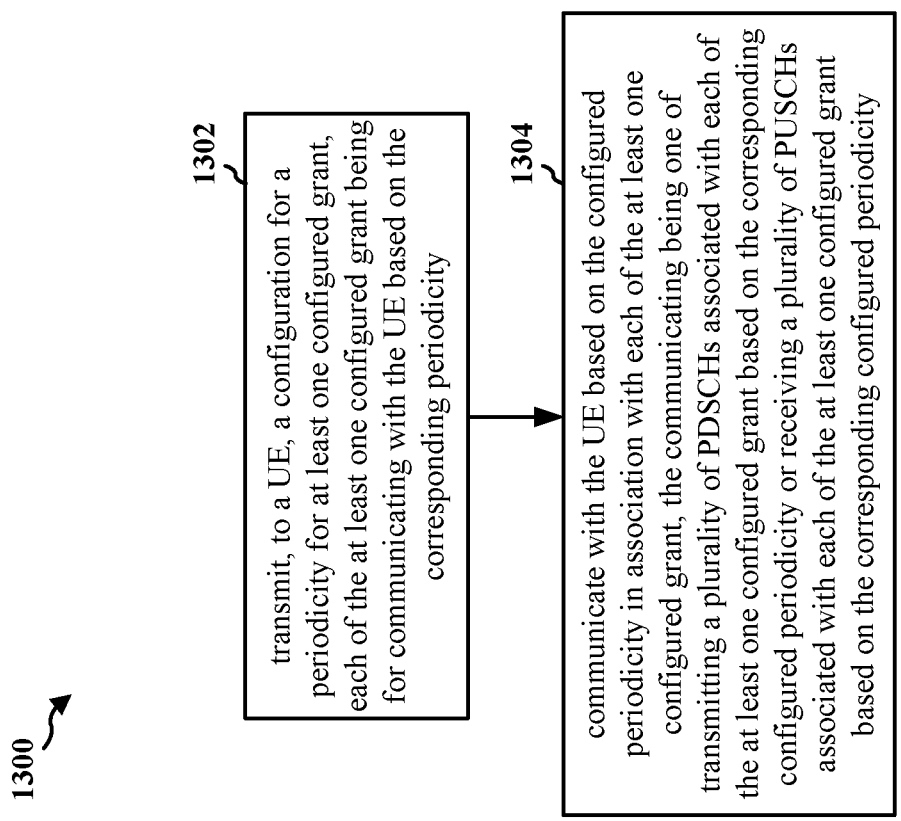
FIG. 13 is a flowchart of a method of wireless communication.

FIG. 13 is a flowchart 1300 of a method of wireless communication. The method may be performed by a base station or a component of a base station (e.g., the base station 102/180, 704; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE with grant occasions using a pattern where multiple occasions are within a long period.

At 1302, the base station may transmit a configuration for a periodicity for at least one configured grant. For example, 1302 may be performed by configuration component 1540 of apparatus 1502. The base station may transmit the configuration for the periodicity for the at least one configured grant to a UE. Each of the at least one configured grant may be for communicating with the UE based on the corresponding periodicity. In some aspects, the at least one configured grant may comprise at least one ULCG. Each of the at least one ULCG may be for receiving the plurality of PUSCHs based on the corresponding periodicity. In some aspects, the at least one configured grant may comprise at least one SPS. Each of the at least one SPS may be for transmitting the plurality of PDSCHs based on the corresponding periodicity.

At 1304, the base station may communicate with the UE based on the configured periodicity in association with each of the at least one configured grant. For example, 1304 may be performed by communication component 1542 of apparatus 1502. The communication may be one of transmitting a plurality of PDSCHs associated with each of the at least one configured grant based on the corresponding configured periodicity or receiving a plurality of PUSCHs associated with each of the at least one configured grant based on the corresponding configured periodicity. The configured periodicity may be one of an integer multiple of a slot with an occasion pattern within the periodicity including at least two occasions with different numbers of slots, or a set of periodicities for a set of interlaced SPSs or ULCGs where at least two of the periodicities are the same. In some aspects, the configured periodicity may be an integer multiple of a slot with an occasion pattern within the periodicity including at least two occasions starting in different slots within each period. The base station may transmit, to the UE, a slot indication of a first occasion. The UE may determine a slot offset of a second occasion and a third occasion based on a configured slot offset and the slot indication of the first occasion. In some aspects, the configured periodicity may be a set of periodicities for a set of interlaced SPSs or ULCGs where at least two of the periodicities are the same.

Figure 14:
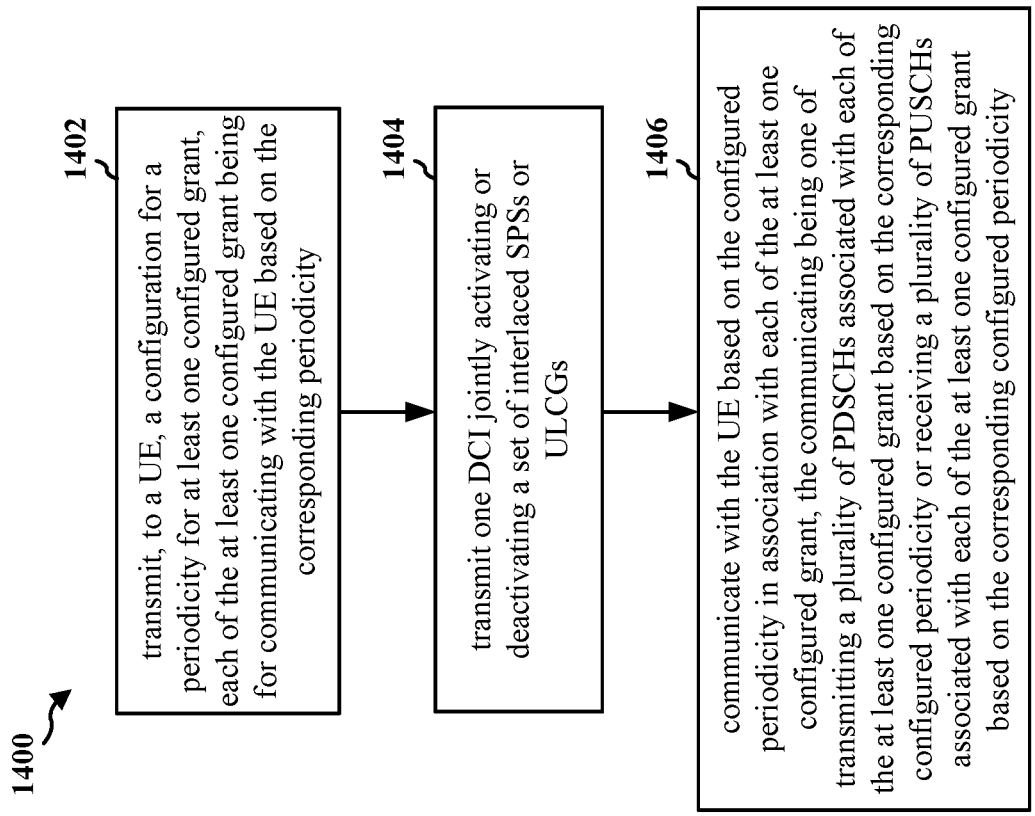
FIG. 14 is a flowchart of a method of wireless communication.

FIG. 14 is a flowchart 1400 of a method of wireless communication. The method may be performed by a base station or a component of a base station (e.g., the base station 102/180, 704; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE with grant occasions using a pattern where multiple occasions are within a long period.

At 1402, the base station may transmit a configuration for a periodicity for at least one configured grant. For example, 1402 may be performed by configuration component 1540 of apparatus 1502. The base station may transmit the configuration for the periodicity for the at least one configured grant to a UE. Each of the at least one configured grant may be for communicating with the UE based on the corresponding periodicity. In some aspects, the at least one configured grant may comprise at least one ULCG. Each of the at least one ULCG may be for receiving the plurality of PUSCHs based on the corresponding periodicity. In some aspects, the at least one configured grant may comprise at least one SPS. Each of the at least one SPS may be for transmitting the plurality of PDSCHs based on the corresponding periodicity.

At 1404, the base station may transmit DCI to activate or deactivate a set of interlaced SPSs or ULCGs. For example, 1404 may be performed by DCI component 1544 of apparatus 1502. The DCI may be configured to jointly activate or deactivate the set of interlaced SPSs or ULCGs with the same periodicities.

At 1406, the base station may communicate with the UE based on the configured periodicity in association with each of the at least one configured grant. For example, 1406 may be performed by communication component 1542 of apparatus 1502. The communication may be one of transmitting a plurality of PDSCHs associated with each of the at least one configured grant based on the corresponding configured periodicity or receiving a plurality of PUSCHs associated with each of the at least one configured grant based on the corresponding configured periodicity. The configured periodicity may be one of an integer multiple of a slot with an occasion pattern within the periodicity including at least two occasions with different numbers of slots, or a set of periodicities for a set of interlaced SPSs or ULCGs where at least two of the periodicities are the same. In some aspects, the configured periodicity may be an integer multiple of a slot with an occasion pattern within the periodicity including at least two occasions starting in different slots within each period. The base station may transmit, to the UE, a slot indication of a first occasion. The UE may determine a slot offset of a second occasion and a third occasion based on a configured slot offset and the slot indication of the first occasion. In some aspects, the configured periodicity may be a set of periodicities for a set of interlaced SPSs or ULCGs where at least two of the periodicities are the same.

Figure 15:
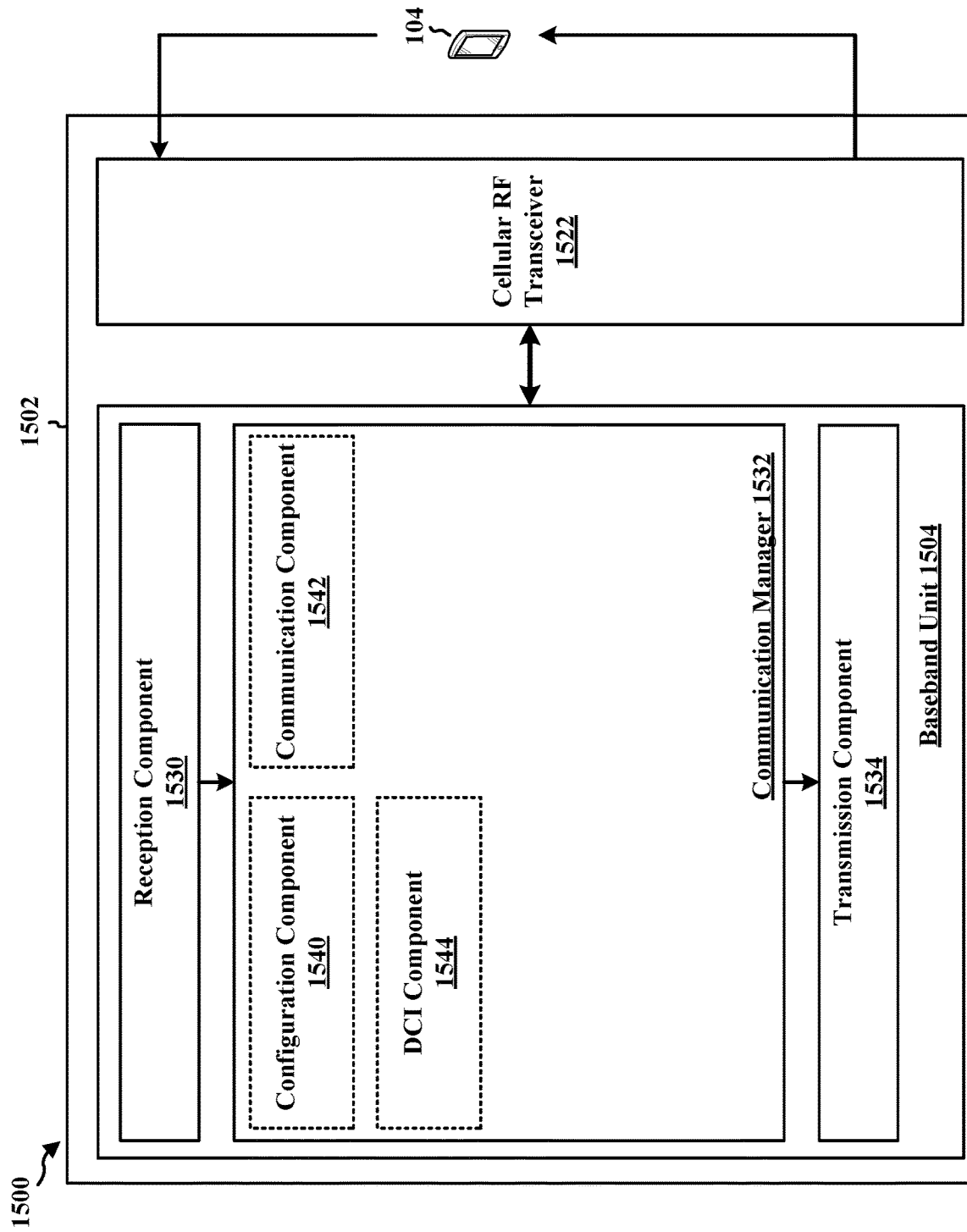
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a configuration component 1540 that may transmit a configuration for a periodicity for a configured grant, e.g., as described in connection with 1202 of FIG. 12. The configuration component 1540 may be configured to transmit a configuration for a periodicity for at least one configured grant, e.g., as described in connection with 1302 of FIG. 13 or 1402 of FIG. 14. The communication manager 1532 further includes a communication component 1542 that may communicate with the UE based on the configured periodicity, e.g., as described in connection with 1204 of FIG. 12. The communication component 1542 may be configured to communicate with the UE based on the configured periodicity in association with each of the at least one configured grant, e.g., as described in connection with 1304 of FIG. 13 or 1406 of FIG. 14. The communication manager 1532 further includes a DCI component 1544 that may transmit DCI to activate or deactivate a set of interlaced SPSs or ULCGs, e.g., as described in connection with 1404 of FIG. 14.

The apparatus may include additional components that perform each of the blocks of the algorithm in the flowcharts of FIGS. 12-14. As such, each block in the flowcharts of FIGS. 12-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to a UE, a configuration for a periodicity for a configured grant. The configured grant being for communicating with the UE based on the corresponding periodicity. The apparatus includes means for communicating with the UE based on the configured periodicity in association with the configured grant. The communicating being one of transmitting a plurality of PDSCHs associated with the configured grant based on the corresponding configured periodicity or receiving a plurality of PUSCHs associated with the configured grant based on the corresponding configured periodicity. The configured periodicity is one of a non-integer multiple or non-integer fraction of a slot. The apparatus includes means for transmitting, to a UE, a configuration for a periodicity for at least one configured grant. Each of the at least one configured grant being for communicating with the UE based on the corresponding periodicity. The apparatus includes means for communicating with the UE based on the configured periodicity in association with each of the at least one configured grant. The communicating being one of transmitting a plurality of PDSCHs associated with each of the at least one configured grant based on the corresponding configured periodicity or receiving a plurality of PUSCHs associated with each of the at least one configured grant based on the corresponding configured periodicity. The configured periodicity is one of an integer multiple of a slot with an occasion pattern within the periodicity including at least two occasions with different numbers of slots, or a set of periodicities for a set of interlaced SPSs or ULCGs where at least two of the periodicities are the same. The apparatus further includes means for transmitting DCI jointly activating or deactivating the set of interlaced SPSs or ULCGs with the same periodicities. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, a configuration for a periodicity for a configured grant, the configured grant being for communicating with the base station based on a corresponding periodicity; and communicate with the base station based on the configured periodicity in association with the configured grant, the communicating being one of receiving a plurality of PDSCHs associated with the configured grant based on the corresponding configured periodicity or transmitting a plurality of PUSCHs associated with the configured grant based on the corresponding configured periodicity, wherein the configured periodicity is one of a non-integer multiple or non-integer fraction of a slot.

Aspect 2 is the apparatus of aspects 1, further including a transceiver coupled to the at least one processor.

Aspect 3 is the apparatus of any of aspects 1 and 2, further includes that the configured periodicity includes X slots and Y symbols, where $X \geq 0$ and $0 < Y < 14$.

Aspect 4 is the apparatus of any of aspects 1-3, further includes that the configured periodicity is 1/Z seconds, where Z is an integer.

Aspect 5 is the apparatus of any of aspects 1-4, further includes that a starting symbol is determined based on 1/Z, wherein the starting symbol is rounded to a symbol index based on 1/Z and the starting symbol of a first configured grant transmission based on the configured grant.

Aspect 6 is the apparatus of any of aspects 1-5, further includes that a starting symbol is determined based on 1/Z, wherein the starting symbol is rounded to a symbol index based on 1/Z and the starting symbol of a previous configured grant transmission after a first configured grant transmission based on the configured grant.

Aspect 7 is the apparatus of any of aspects 1-6, further includes that Z=n*30, where n is an integer greater than or equal to 1.

Aspect 8 is the apparatus of any of aspects 1-7, further includes that the configured grant comprises an ULCG, wherein the ULCG being for transmitting the plurality of PUSCHs based on the corresponding periodicity.

Aspect 9 is the apparatus of any of aspects 1-8, further includes that the configured grant comprises at least one SPS, wherein the SPS being for receiving the plurality of PDSCHs based on the corresponding periodicity.

Aspect 10 is the apparatus of any of aspects 1-9, further includes that the communicating with the base station based on the configured periodicity comprises delaying the communication until a next slot when the communication based on the configured periodicity extends across a slot boundary.

Aspect 11 is the apparatus of any of aspects 1-10, further includes that the communicating with the base station based on the configured periodicity comprises communicating in multiple adjacent slots when the communication based on the configured periodicity extends across a slot boundary, the multiple adjacent slots carrying a same TB or data packet.

Aspect 12 is a method of wireless communication for implementing any of aspects 1-11.

Aspect 13 is an apparatus for wireless communication including means for implementing any of aspects 1-11.

Aspect 14 is a computer-readable medium storing computer executable code, where the code when executed by a processor causes the processor to implement any of aspects 1-11.

Aspect 15 is an apparatus for wireless communication at a UE including at least one processor coupled to a memory and configured to receive, from a base station, a configuration for a periodicity for at least one configured grant, each of the at least one configured grant being for communicating with the base station based on a corresponding periodicity; and communicate with the base station based on the configured periodicity in association with each of the at least one configured grant, the communicating being one of receiving a plurality of PDSCHs associated with each of the at least one configured grant based on the corresponding configured periodicity or transmitting a plurality of PUSCHs associated with each of the at least one configured grant based on the corresponding configured periodicity, wherein the configured periodicity is one of an integer multiple of a slot with an occasion pattern within the periodicity including at least two occasions, or a set of periodicities for a set of interlaced SPSs or ULCGs where at least two of the periodicities are the same.

Aspect 16 is the apparatus of aspect 15, further including a transceiver coupled to the at least one processor.

Aspect 17 is the apparatus of any of aspects 15 and 16, further includes that the configured periodicity is an integer multiple of a slot with an occasion pattern within the periodicity including at least two occasions starting in different slots within each period.

Aspect 18 is the apparatus of any of aspects 15-17, further includes that the UE receives, from the base station, a slot indication of a first occasion, wherein the UE determines a slot offset of a second occasion based on a configured slot offset and the slot indication of the first occasion.

Aspect 19 is the apparatus of any of aspects 15-18, further includes that the at least one processor is further configured to receive DCI jointly activating or deactivating the set of interlaced SPSs or ULCGs with the same periodicities.

Aspect 20 is the apparatus of any of aspects 15-19, further includes that the at least one configured grant comprises at least one ULCG, wherein each of the at least one ULCG being for transmitting the plurality of PUSCHs based on the corresponding periodicity.

Aspect 21 is the apparatus of any of aspects 15-20, further includes that the at least one configured grant comprises at least one SPS, wherein each of the at least one SPS being for receiving the plurality of PDSCHs based on the corresponding periodicity.

Aspect 22 is a method of wireless communication for implementing any of aspects 15-21.

Aspect 23 is an apparatus for wireless communication including means for implementing any of aspects 15-21.

Aspect 24 is a computer-readable medium storing computer executable code, where the code when executed by a processor causes the processor to implement any of aspects 15-21.

Aspect 25 is an apparatus for wireless communication at a base station including at least one processor coupled to a memory and configured to transmit, to a UE, a configuration for a periodicity for a configured grant, the configured grant being for communicating with the UE based on a corresponding periodicity; and communicate with the UE based on the configured periodicity in association with the configured grant, the communicating being one of transmitting a plurality of PDSCHs associated with the configured grant based on the corresponding configured periodicity or receiving a plurality of PUSCHs associated with the configured grant based on the corresponding configured periodicity, wherein the configured periodicity is one of a non-integer multiple or non-integer fraction of a slot.

Aspect 26 is the apparatus of aspect 25, further including a transceiver coupled to the at least one processor.

Aspect 27 is the apparatus of any of aspects 25 and 26, further includes that the configured periodicity includes X slots and Y symbols, where $X \geq 0$ and $0 < Y < 14$.

Aspect 28 is the apparatus of any of aspects 25-27, further includes that the configured periodicity is $1/Z$ seconds, where Z is an integer.

Aspect 29 is the apparatus of any of aspects 25-28, further includes that the configured grant comprises an ULCG, wherein the ULCG being for receiving the plurality of PUSCHs based on the corresponding periodicity.

Aspect 30 is the apparatus of any of aspects 25-29, further includes that the configured grant comprises at least one SPS, wherein the SPS being for transmitting the plurality of PDSCHs based on the corresponding periodicity.

Aspect 31 is a method of wireless communication for implementing any of aspects 25-30.

Aspect 32 is an apparatus for wireless communication including means for implementing any of aspects 25-30.

Aspect 33 is a computer-readable medium storing computer executable code, where the code when executed by a processor causes the processor to implement any of aspects 25-30.

What is claimed is:

1. An apparatus for wireless communication at a user equipment (UE), comprising:
a memory; and
at least one processor coupled to the memory and configured to:
receive, from a base station, a configuration for a periodicity for a configured grant, the configured grant being for communicating with the base station based on a corresponding periodicity; and
communicate with the base station based on the configured periodicity in association with the configured grant, communication with the base station being one of receiving a plurality of physical downlink shared channels (PDSCHs) associated with the configured grant based on the corresponding configured periodicity or transmitting a plurality of physical uplink shared channels (PUSCHs) associated with the configured grant based on the corresponding configured periodicity,
wherein the configured periodicity is one of a non-integer multiple or non-integer fraction of a slot, wherein the configured periodicity is 1/Z seconds, where Z is an integer greater than 1.

2. The apparatus of claim 1, further comprising a transceiver coupled to the at least one processor.

3. The apparatus of claim 1, wherein the configured periodicity includes X slots and Y symbols, where X≥0 and 0<Y<14.

4. The apparatus of claim 1, wherein a starting symbol is determined based on 1/Z, wherein the starting symbol is rounded to a symbol index based on 1/Z and the starting symbol of a first configured grant transmission based on the configured grant.

5. The apparatus of claim 1, wherein a starting symbol is determined based on 1/Z, wherein the starting symbol is rounded to a symbol index based on 1/Z and the starting symbol of a previous configured grant transmission after a first configured grant transmission based on the configured grant.

6. The apparatus of claim 1, wherein Z=n*30, where n is an integer greater than or equal to 1.

7. The apparatus of claim 1, wherein the configured grant comprises an uplink configured grant (ULCG), wherein the ULCG being for transmitting the plurality of PUSCHs based on the corresponding periodicity.

8. The apparatus of claim 1, wherein the configured grant comprises at least one semi-persistent scheduling (SPS), wherein the SPS being for receiving the plurality of PDSCHs based on the corresponding periodicity.

9. The apparatus of claim 1, wherein the communicating with the base station based on the configured periodicity comprises delaying the communication until a next slot when the communication based on the configured periodicity extends across a slot boundary.

10. The apparatus of claim 1, wherein the communicating with the base station based on the configured periodicity comprises communicating in multiple adjacent slots when the communication based on the configured periodicity extends across a slot boundary, the multiple adjacent slots carrying a same transport block (TB) or data packet.

11. An apparatus for wireless communication at a user equipment (UE), comprising:
a memory; and
at least one processor coupled to the memory and configured to:
receive, from a base station, a configuration for a periodicity for at least one configured grant, each of the at least one configured grant being for communicating with the base station based on a corresponding periodicity; and
communicate with the base station based on the configured periodicity in association with each of the at least one configured grant, communication with the base station being one of receiving a plurality of physical downlink shared channels (PDSCHs) associated with each of the at least one configured grant based on the corresponding configured periodicity or transmitting a plurality of physical uplink shared channels (PUSCHs) associated with each of the at least one configured grant based on the corresponding configured periodicity,
wherein the configured periodicity is one of an integer multiple of a slot with an occasion pattern within the periodicity including at least two occasions.

12. The apparatus of claim 11, further comprising a transceiver coupled to the at least one processor.

13. The apparatus of claim 11, wherein the configured periodicity is the integer multiple of the slot with the occasion pattern within the periodicity including the at least two occasions starting in different slots within each period.

14. The apparatus of claim 13, wherein the UE receives, from the base station, a slot indication of a first occasion, wherein the UE determines a slot offset of a second occasion based on a configured slot offset and the slot indication of the first occasion.

15. The apparatus of claim 11, wherein the at least one processor is further configured to:
receive downlink control information (DCI) jointly activating or deactivating a set of interlaced semi-persistent scheduling (SPSs) or uplink configured grants (ULCGs) with same periodicities.

16. The apparatus of claim 11, wherein the at least one configured grant comprises at least one ULCG, wherein each of the at least one ULCG being for transmitting the plurality of PUSCHs based on the corresponding periodicity.

17. The apparatus of claim 11, wherein the at least one configured grant comprises at least one semi-persistent scheduling (SPS), wherein each of the at least one SPS being for receiving the plurality of PDSCHs based on the corresponding periodicity.

18. An apparatus for wireless communication at a base station, comprising:
a memory; and
at least one processor coupled to the memory and configured to:
transmit, to a user equipment (UE), a configuration for a periodicity for a configured grant, the configured grant being for communicating with the UE based on a corresponding periodicity; and
communicate with the UE based on the configured periodicity in association with the configured grant, communication with the UE being one of transmitting a plurality of physical downlink shared channels (PDSCHs) associated with the configured grant based on the corresponding configured periodicity or receiving a plurality of physical uplink shared channels (PUSCHs) associated with the configured grant based on the corresponding configured periodicity,
wherein the configured periodicity is one of a non-integer multiple or non-integer fraction of a slot, wherein the configured periodicity is 1/Z seconds, where Z is an integer greater than 1.

19. The apparatus of claim 18, further comprising a transceiver coupled to the at least one processor.

20. The apparatus of claim 18, wherein the configured periodicity includes X slots and Y symbols, where X≥0 and 0<Y<14.

21. The apparatus of claim 18, wherein the configured periodicity is 1/Z seconds, where Z is an integer.

22. The apparatus of claim 18, wherein the configured grant comprises an uplink configured grant (ULCG), wherein the ULCG being for receiving the plurality of PUSCHs based on the corresponding periodicity.

23. The apparatus of claim 18, wherein the configured grant comprises at least one semi-persistent scheduling (SPS), wherein the SPS being for transmitting the plurality of PDSCHs based on the corresponding periodicity.

24. An apparatus for wireless communication at a base station, comprising:
- a memory; and
- at least one processor coupled to the memory and configured to:
  - transmit, to a user equipment (UE), a configuration for a periodicity for at least one configured grant, each of the at least one configured grant being for communicating with the UE based on a corresponding periodicity; and
  - communicate with the UE based on the configured periodicity in association with each of the at least one configured grant, communication with the UE being one of transmitting a plurality of physical downlink shared channels (PDSCHs) associated with each of the at least one configured grant based on the corresponding configured periodicity or receiving a plurality of physical uplink shared channels (PUSCHs) associated with each of the at least one configured grant based on the corresponding configured periodicity,
- wherein the configured periodicity is one of an integer multiple of a slot with an occasion pattern within the periodicity including at least two occasions.

25. The apparatus of claim 24, further comprising a transceiver coupled to the at least one processor.

26. The apparatus of claim 24, wherein the configured periodicity is the integer multiple of the slot with the occasion pattern within the periodicity including the at least two occasions starting in different slots within each period.

27. The apparatus of claim 26, wherein the base station transmits, to the UE, a slot indication of a first occasion, wherein the UE determines a slot offset of a second occasion based on a configured slot offset and the slot indication of the first occasion.

28. The apparatus of claim 24, wherein the at least one processor is further configured to:
- transmit downlink control information (DCI) jointly activating or deactivating a set of interlaced semi-persistent scheduling (SPSs) or uplink configured grants (ULCGs) with same periodicities.

29. The apparatus of claim 24, wherein the at least one configured grant comprises at least one uplink configured grant (ULCG), wherein each of the at least one ULCG being for transmitting the plurality of PUSCHs based on the corresponding periodicity.

* * * * *